H. H. MURDICK.
AGRICULTURAL IMPLEMENT.
APPLICATION FILED FEB. 27, 1918.
1,284,131.
Patented Nov. 5, 1918.
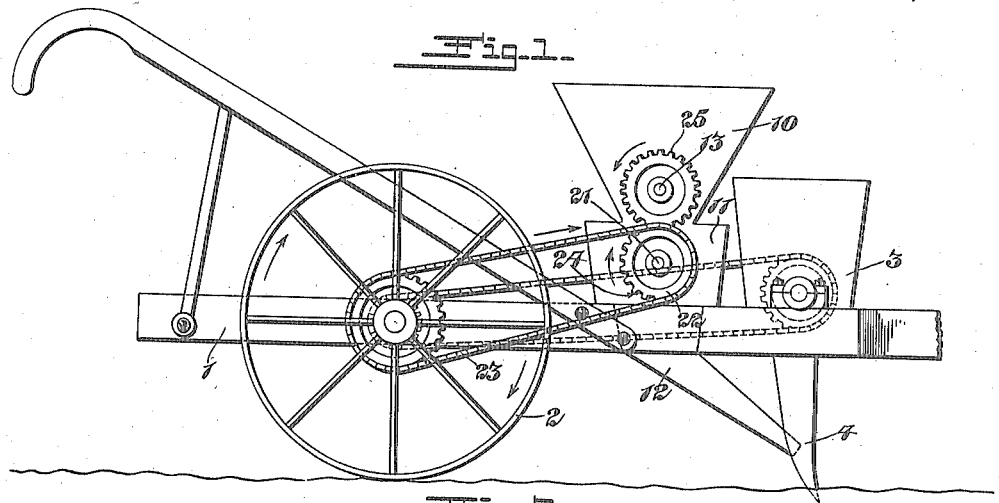
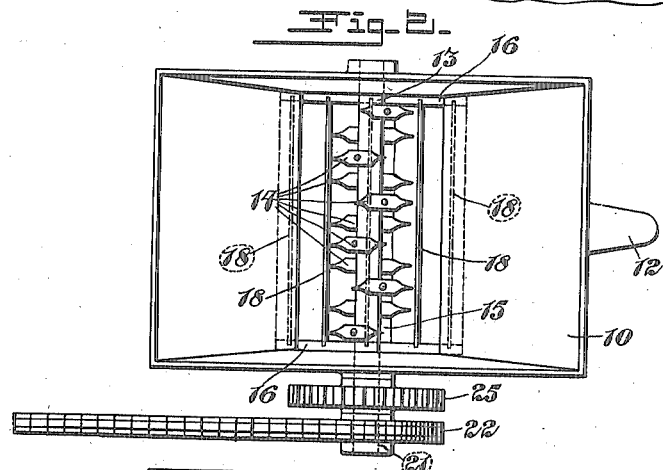
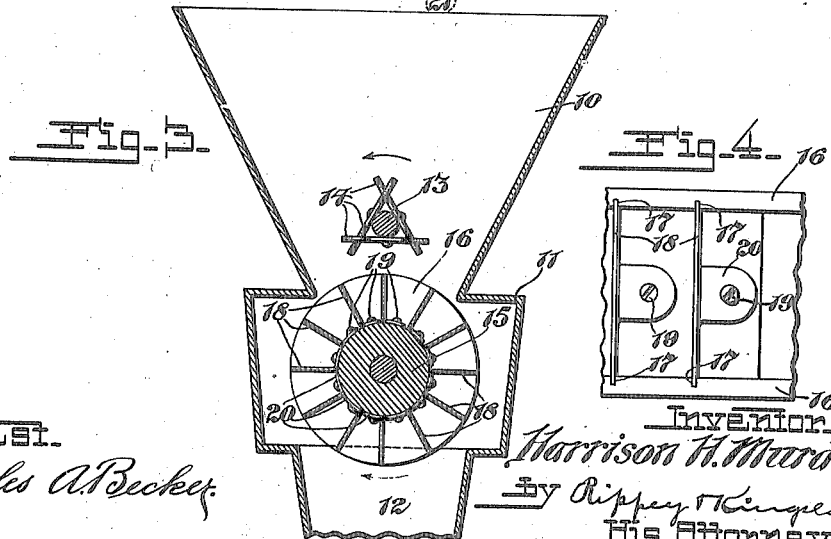
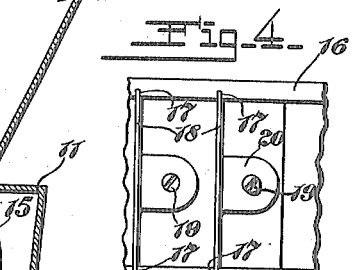
Inventor
Harrison H. Murdick
by Rippey & Kingseaut
His Attorneys
Attest
Charles A. Becker

UNITED STATES PATENT OFFICE.

HARRISON H. MURDICK, OF RICHWOODS, MISSOURI.

AGRICULTURAL IMPLEMENT.

1,284,131.  Specification of Letters Patent.  Patented Nov. 5, 1918.

Application filed February 27, 1918. Serial No. 219,371.

*To all whom it may concern:*

Be it known that I, HARRISON H. MURDICK, a citizen of the United States, residing at Richwoods, Washington county, and State of Missouri, have invented a new and useful Agricultural Implement, of which the following is a specification.

This invention relates to improvements in agricultural implements and more particularly to a fertilizer attachment for grain drills, and consists in the novel construction hereinafter disclosed.

An object of the invention is to provide a fertilizer attachment for grain drills adapted to feed in measured quantities the fertilizer for mixture with the seed, as the same is planted.

Another object of the invention is to provide a fertilizer attachment including a receiving hopper from which the fertilizer is advanced in measured quantities into a spout for mixture with the seed grain.

Additional advantages resulting from the structure will be apparent without specific mention, reference being made to the accompanying drawing, in which—

Figure 1 is a side elevation of a conventional form of grain drill showing the fertilizer attachment of the invention applied thereto.

Fig. 2 is a plan view of the attachment embodying the invention.

Fig. 3 is a vertical section of the attachment embodying the invention.

Fig. 4 is a detailed view of a portion of the periphery of the feeding drum.

In the embodiment of the invention illustrated in drawing, the attachment of the invention is shown applied to a conventional form of drill comprising a frame work 1 mounted on wheels 2, upon which is supported the planting mechanism comprising the seed hopper 3 and the hoe drill 4, it being understood that there is a seed feeding device between the hopper and hoe. This mechanism is well known in the art and is simply illustrated in connection with the present invention for the purpose of showing an application of the invention to machines of this type. It will, of course, be understood that the attachment may be used with any type of grain drill or planter, the method of attachment and mounting of the fertilizer being adapted to the particular construction of grain drill in connection with which it may be used.

The fertilizer attachment of the present invention includes a hopper 10 having downwardly inclined walls and an open top. The hopper 10 is supported upon a boxing or housing 11 for the feed roller. The boxing or housing 11 is supported transversely on the frame of the machine preferably back of the seed feeding mechanism. Extending from the top of the housing 11 is a chute 12 having a forwardly inclined section which enters at its lower end the tube of the grain drill 4. Extending transversely of the hopper 10 is a shaft 13 which is suitably journaled in the side walls of the hopper, so that it may freely revolve therein. The shaft 13 carries a series of blades or knives 14 arranged in staggered relation on the shaft. In the housing 11 is a feeding drum 15, the axis of which is below and parallel with the axis of the shaft 13. The drum 15 has marginal annular flanges 16 at each side which extends outwardly a considerable distance from the periphery of the drum so that there is an annular open space between the flanges. Each of the flanges 16 has in its inner face a series of grooves 17, said grooves being equally spaced apart and the grooves in each flange being in cross alinement.

Plates 18 are arranged to be mounted in the alined pairs of grooves in the flanges 16, being held in position by set screws 19 passing through openings in lugs 20 at the base of the plates 18, the set screws 19 screwing into the face of the drum. Thus it will be observed that the plates may be seated in the feeding drum so as to form pockets into which the fertilizer is fed from the hopper. As the plates are removable the width of the pockets may be varied, thereby varying the quantity of fertilizer fed into the discharge chute of the attachment. The drum 15 is journaled in the side walls of the housing 11 and has a shaft 21 extending outwardly from one side of the box. The shaft 21 carries a sprocket wheel 22 which is connected with and driven from the main axle of the drill through a flexible chain 23. The shaft 21 also carries a gear wheel 24 which meshes with a gear wheel 25 secured on an extended end of the shaft 13, so that the shaft 13 and the drum are revolved together in converging directions of rotation.

From the foregoing description of the construction of the attachment it will be observed that fertilizer deposited in the receiving hopper 10 will be agitated and cut into particles of convenient size to be received into the pockets in the feeding drum 15 from which it will be delivered into the chute 12. This construction permits the use of fertilizer in various forms which, by means of the knives, is cut and broken before delivery to the feeding drum to such a size as will permit a uniform delivery of the fertilizer and will prevent clogging of the fertilizer in the bottom of the hopper or in the passages from the feed drum housing into the delivery chute.

I am aware that the construction may be modified in certain details without departure from the spirit and scope of the invention.

What I claim and desire to secure by Letters Patent, is:—

1. In an agricultural implement, a fertilizer attachment comprising a receiving hopper, a revoluble feeding drum located below said hopper, and a delivery chute from said feeding drum, in combination with a revoluble shaft located in the hopper, and knives carried by said shaft, adapted to cut the material in the hopper.

2. A fertilizer attachment for agricultural implements comprising a receiving hopper having an opening in the bottom thereof, a cutting device in the hopper adapted to cut the material therein, a revoluble drum below said hopper, said drum having pockets in its periphery adapted to receive measured quantities of the fertilizer from said hopper, and a delivery chute leading from said drum.

3. A fertilizer attachment for agricultural implements, comprising a hopper, a revoluble cutter mounted in said hopper, a feeding drum below said hopper, a housing for said feeding drum, and a delivery chute from said housing.

4. In a fertilizer attachment for agricultural implements, a receiving hopper, a revoluble cutter having a plurality of blades having cutting edges revolubly mounted in said hopper, a feeding drum having adjustable pockets in its periphery adapted to receive and advance fertilizer from said hopper, a housing for said feeding drum, a discharge chute from said housing, and driving connections for operating said cutter from said feeding drum.

5. In a fertilizer attachment for agricultural implements, a receiving hopper, a housing mounted below said hopper, a cutter revolubly mounted in said hopper, a feeding drum revolubly mounted in said housing, a discharge chute from said housing, and driving mechanism whereby said cutter and said feeding drum are rotated simultaneously.

6. In a fertilizer attachment for agricultural implements, the combination with a hopper, of a feeding drum adapted to receive fertilizer from said hopper, said drum having an annular chamber at its periphery, removable partition plates adapted to be seated in the periphery of said drum and thereby form receiving pockets in said drum, and a discharge chute in connection with said drum adapted to receive the fertilizer advanced from said hopper and discharge thereinto from said feeding drum.

7. A fertilizer attachment for agricultural implements, comprising a receiving hopper having an opening in the bottom thereof, a shaft extending transversely through said hopper, a series of cutting blades arranged in staggered relation on said shaft, means for revolving said shaft to effect cutting of the material in said hopper, a revoluble drum below said hopper, said drum having pockets in its periphery adapted to receive measured quantities of the fertilizer after the same has been cut, and a delivery chute for delivering the fertilizer to the ground.

HARRISON H. MURDICK.